(12) United States Patent
Tatat et al.

(10) Patent No.: US 9,128,263 B2
(45) Date of Patent: Sep. 8, 2015

(54) CABLE HAVING LUBRICATED, EXTRACTABLE ELEMENTS

(75) Inventors: Olivier Tatat, Sangatte (FR); Klaus Nothofer, Erkrath (DE)

(73) Assignee: Draka Comteq, B.V., Amsterdam (NL)

( * ) Notice: Subject to any disclaimer, the term of this patent is extended or adjusted under 35 U.S.C. 154(b) by 837 days.

(21) Appl. No.: 12/710,584

(22) Filed: Feb. 23, 2010

(65) Prior Publication Data

US 2010/0215328 A1    Aug. 26, 2010

(30) Foreign Application Priority Data

Feb. 23, 2009 (FR) ..................................... 09 00815

(51) Int. Cl.
*G02B 6/44* (2006.01)
(52) U.S. Cl.
CPC ............ *G02B 6/4495* (2013.01); *G02B 6/4429* (2013.01)
(58) Field of Classification Search
None
See application file for complete search history.

(56) References Cited

U.S. PATENT DOCUMENTS

| | | | | |
|---|---|---|---|---|
| 4,515,435 | A | * | 5/1985 | Anderson ....................... 385/103 |
| 4,687,294 | A | * | 8/1987 | Angeles ......................... 385/102 |
| 4,838,643 | A | | 6/1989 | Hodges et al. |
| 5,015,063 | A | * | 5/1991 | Panuska et al. ................ 385/102 |
| 5,114,746 | A | | 5/1992 | O'Leary et al. |
| 5,181,268 | A | | 1/1993 | Chien |
| 5,492,741 | A | * | 2/1996 | Akao et al. .................... 428/35.2 |
| 5,574,816 | A | | 11/1996 | Yang et al. |
| 5,627,932 | A | * | 5/1997 | Kiel et al. ...................... 385/102 |
| 5,717,805 | A | | 2/1998 | Stulpin |
| 5,761,362 | A | | 6/1998 | Yang et al. |
| 5,911,023 | A | | 6/1999 | Risch et al. |
| 5,982,968 | A | | 11/1999 | Stulpin |
| 6,035,087 | A | | 3/2000 | Bonicel et al. |
| 6,066,397 | A | | 5/2000 | Risch et al. |
| 6,085,009 | A | | 7/2000 | Risch et al. |
| 6,134,363 | A | | 10/2000 | Hinson et al. |
| 6,175,677 | B1 | | 1/2001 | Yang et al. |
| 6,181,857 | B1 | | 1/2001 | Emeterio et al. |
| 6,188,026 | B1 | | 2/2001 | Cope et al. |
| 6,210,802 | B1 | | 4/2001 | Risch et al. |
| 6,215,931 | B1 | | 4/2001 | Risch et al. |
| 6,314,224 | B1 | | 11/2001 | Stevens et al. |
| 6,321,012 | B1 | | 11/2001 | Shen |
| 6,321,014 | B1 | | 11/2001 | Overton et al. |
| 6,334,016 | B1 | | 12/2001 | Greer, IV |

(Continued)

FOREIGN PATENT DOCUMENTS

| CN | 2821602 Y | 9/2006 |
|---|---|---|
| CN | 1871534 A | 11/2006 |

(Continued)

OTHER PUBLICATIONS

French Search Report and Written Opinion in counterpart French Application No. 0900815 dated Sep. 14, 2009, pp. 1-12.

(Continued)

*Primary Examiner* — Uyen Chau N Le
*Assistant Examiner* — Hoang Tran
(74) *Attorney, Agent, or Firm* — Additon, Higgins & Pendleton, P.A.

(57) ABSTRACT

The invention relates to a cable (10) that includes an outer sheath (11) defining a longitudinal cavity (12). The cable (10) also includes a plurality of elements (1) extending within the cavity. Typically, the elements are at least partially coated with a lubricant film.

21 Claims, 5 Drawing Sheets

(56) References Cited

U.S. PATENT DOCUMENTS

| | | | |
|---|---|---|---|
| 6,381,390 B1 | 4/2002 | Hutton et al. | |
| 6,493,491 B1 | 12/2002 | Shen et al. | |
| 6,603,908 B2 | 8/2003 | Dallas et al. | |
| 6,618,538 B2 | 9/2003 | Nechitailo et al. | |
| 6,658,184 B2 | 12/2003 | Bourget et al. | |
| 6,681,070 B2 * | 1/2004 | Cecchi et al. | 385/109 |
| 6,749,446 B2 | 6/2004 | Nechitailo | |
| 6,845,200 B1 | 1/2005 | Quinn | |
| 6,853,783 B2 * | 2/2005 | Chiasson et al. | 385/114 |
| 6,912,347 B2 | 6/2005 | Rossi et al. | |
| 6,922,515 B2 | 7/2005 | Nechitailo et al. | |
| 6,941,049 B2 | 9/2005 | Risch et al. | |
| 7,045,010 B2 | 5/2006 | Sturman, Jr. | |
| 7,162,128 B2 | 1/2007 | Lovie et al. | |
| 7,322,122 B2 | 1/2008 | Overton et al. | |
| 7,346,244 B2 | 3/2008 | Gowan et al. | |
| 7,356,234 B2 | 4/2008 | de Montmorillon et al. | |
| 7,483,613 B2 | 1/2009 | Bigot-Astruc et al. | |
| 7,515,795 B2 | 4/2009 | Overton et al. | |
| 7,555,186 B2 | 6/2009 | Flammer et al. | |
| 7,567,739 B2 | 7/2009 | Overton et al. | |
| 7,570,852 B2 * | 8/2009 | Nothofer et al. | 385/100 |
| 7,587,111 B2 | 9/2009 | de Montmorillon et al. | |
| 7,599,589 B2 | 10/2009 | Overton et al. | |
| 7,623,747 B2 | 11/2009 | de Montmorillon et al. | |
| 7,639,915 B2 | 12/2009 | Parris et al. | |
| 7,646,952 B2 | 1/2010 | Parris | |
| 7,646,954 B2 | 1/2010 | Tatat | |
| 7,724,998 B2 | 5/2010 | Parris et al. | |
| 7,817,891 B2 | 10/2010 | Lavenne et al. | |
| 2002/0009272 A1 * | 1/2002 | Parris | 385/109 |
| 2002/0122639 A1 | 9/2002 | Le Noane et al. | |
| 2002/0122640 A1 | 9/2002 | Strong et al. | |
| 2004/0120666 A1 | 6/2004 | Chalk et al. | |
| 2005/0031277 A1 | 2/2005 | Japon | |
| 2007/0274647 A1 | 11/2007 | Pizzorno et al. | |
| 2008/0285924 A1 * | 11/2008 | Graveston et al. | 385/102 |
| 2008/0292262 A1 | 11/2008 | Overton et al. | |
| 2009/0175583 A1 | 7/2009 | Overton | |
| 2009/0214167 A1 | 8/2009 | Lookadoo et al. | |
| 2009/0252469 A1 | 10/2009 | Sillard et al. | |
| 2009/0279833 A1 | 11/2009 | Overton et al. | |
| 2009/0279835 A1 | 11/2009 | de Montmorillon et al. | |
| 2009/0279836 A1 | 11/2009 | de Montmorillon et al. | |
| 2009/0297107 A1 | 12/2009 | Tatat | |
| 2010/0021170 A1 | 1/2010 | Lumineau et al. | |
| 2010/0028020 A1 | 2/2010 | Gholami et al. | |
| 2010/0067855 A1 | 3/2010 | Barker | |
| 2010/0067857 A1 | 3/2010 | Lovie et al. | |
| 2010/0092135 A1 | 4/2010 | Barker et al. | |
| 2010/0092138 A1 | 4/2010 | Overton | |
| 2010/0092139 A1 | 4/2010 | Overton | |
| 2010/0092140 A1 | 4/2010 | Overton | |
| 2010/0118388 A1 | 5/2010 | Pastouret et al. | |
| 2010/0119202 A1 | 5/2010 | Overton | |
| 2010/0135623 A1 | 6/2010 | Overton | |
| 2010/0135624 A1 | 6/2010 | Overton et al. | |
| 2010/0135625 A1 | 6/2010 | Overton | |
| 2010/0135627 A1 | 6/2010 | Pastouret et al. | |
| 2010/0142033 A1 | 6/2010 | Regnier et al. | |
| 2010/0142969 A1 | 6/2010 | Gholami et al. | |
| 2010/0150505 A1 | 6/2010 | Testu et al. | |
| 2010/0154479 A1 | 6/2010 | Milicevic et al. | |
| 2010/0166375 A1 | 7/2010 | Parris | |
| 2010/0171945 A1 | 7/2010 | Gholami et al. | |
| 2010/0183821 A1 | 7/2010 | Hartsuiker et al. | |
| 2010/0189397 A1 | 7/2010 | Richard et al. | |
| 2010/0189399 A1 | 7/2010 | Sillard et al. | |
| 2010/0189400 A1 | 7/2010 | Sillard et al. | |
| 2010/0202741 A1 | 8/2010 | Ryan et al. | |
| 2010/0214649 A1 | 8/2010 | Burov et al. | |
| 2010/0215328 A1 | 8/2010 | Tatat et al. | |
| 2010/0266249 A1 | 10/2010 | Bonicel et al. | |
| 2011/0044595 A1 | 2/2011 | Sillard et al. | |

FOREIGN PATENT DOCUMENTS

| | | |
|---|---|---|
| EP | 0293725 A2 | 12/1988 |
| EP | 0949635 A1 | 10/1999 |
| EP | 1818703 A1 | 8/2007 |
| EP | 1921478 A1 | 5/2008 |
| EP | 2221647 A2 | 8/2010 |
| GB | 2221080 A | 1/1990 |
| JP | 09-204822 A | 8/1997 |
| WO | 01/98810 A1 | 12/2001 |
| WO | 02/067035 A | 8/2002 |
| WO | 2005/040882 A1 | 5/2005 |
| WO | 2009/062131 A1 | 5/2009 |

OTHER PUBLICATIONS

European Search Report and Written Opinion in counterpart European Application No. 10001710 dated Mar. 25, 2011, pp. 1-16.

European Search Report in counterpart European Application No. 10001710 dated Jul. 19, 2010, pp. 1-7.

Chinese Office Action in counterpart Chinese Application No. 201010148556.7 dated Aug. 23, 2012, pp. 1-8.

English translation of Chinese Office Action in counterpart Chinese Application No. 201010148556.7 dated Aug. 23, 2012, pp. 1-10.

Second Chinese Office Action issued in counterpart Chinese Application No. 201010148556.7 dated Apr. 27, 2013, pp. 1-7.

English translation of Second Chinese Office Action issued in counterpart Chinese Application No. 201010148556.7 dated Apr. 27, 2013, pp. 1-10.

Third Chinese Office Action issued in counterpart Chinese Application No. 201010148556.7 dated Aug. 19, 2013, pp. 1-7.

English translation of Third Chinese Office Action issued in counterpart Chinese Application No. 201010148556.7 dated Aug. 19, 2013, pp. 1-10.

English-translation of Decision of Rejection issued in counterpart Chinese Application No. 201010148556.7 dated Jan. 9, 2014, pp. 1-8.

Office Action in counterpart European Application No. 10001710.2 dated Mar. 30, 2015, pp. 1-4.

* cited by examiner

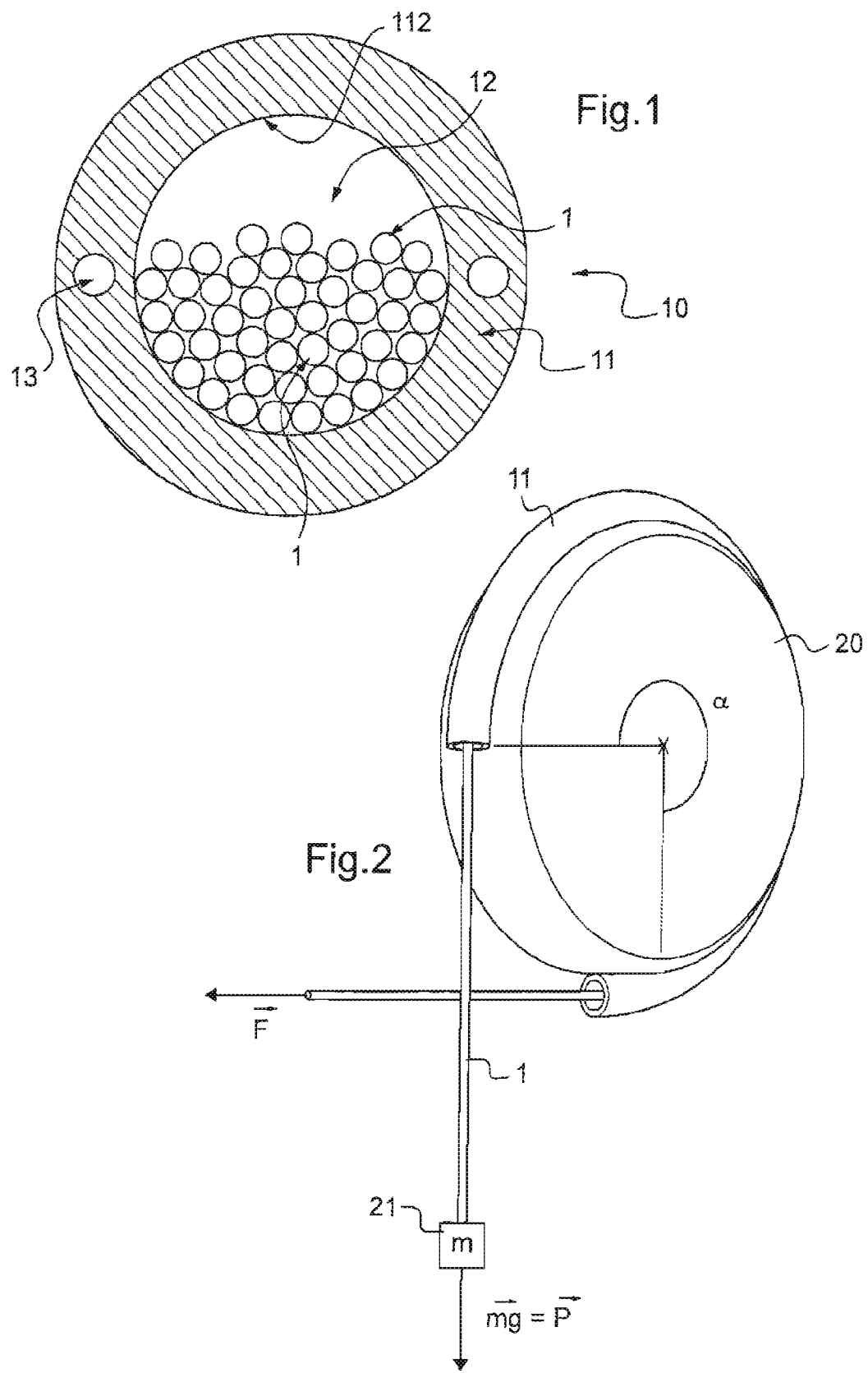

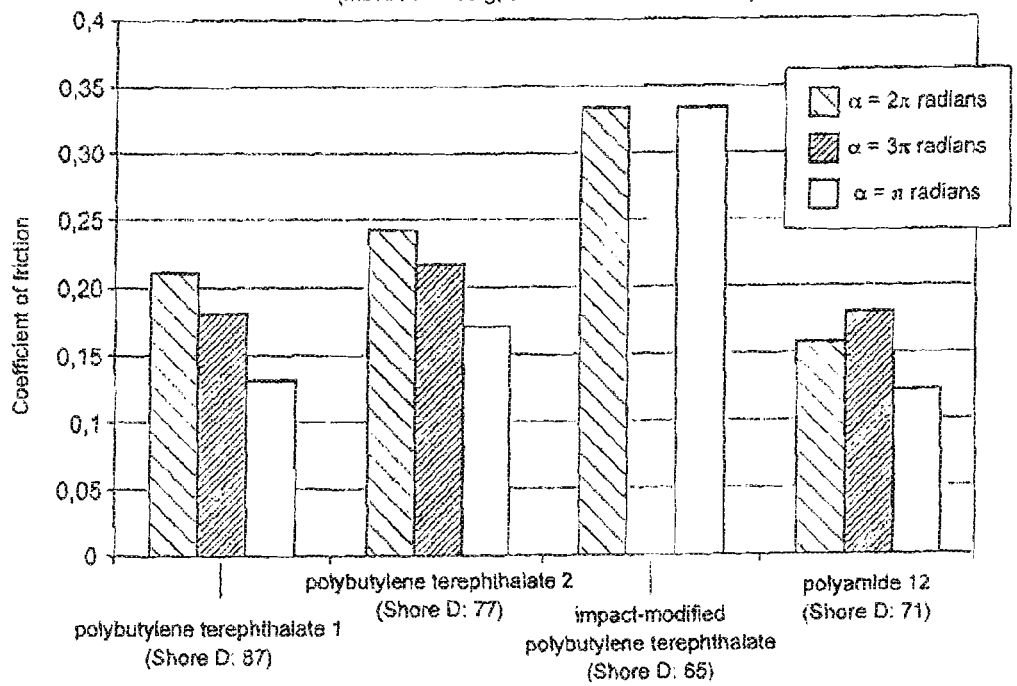
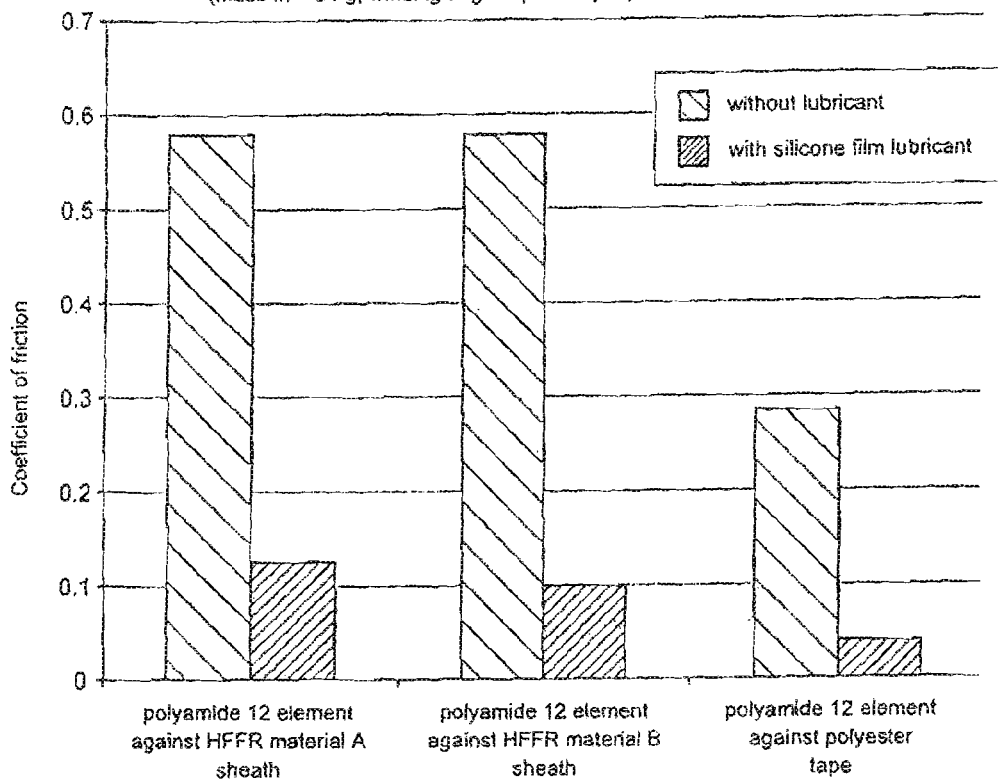

CABLE HAVING LUBRICATED, EXTRACTABLE ELEMENTS

CROSS-REFERENCE TO PRIORITY APPLICATION

This application claims the benefit of pending French patent application Ser. No. 09/00815 for "Câble comportant des éléments à extraire, procédé d'extration desdits éléments et procédé fabrication associé" (filed Feb. 23, 2009, at the National Institute of Industrial Property (France)), which is hereby incorporated by reference in its entirety.

FIELD OF THE INVENTION

The present invention relates to the field of cables that include extractable elements.

BACKGROUND

It is common for a cable to include elements (e.g., subunits) that can be extracted from the cable. Typically, these elements extend side-by-side within the cable (e.g., substantially in parallel within a central cavity defined by the cable's inside wall). Generally, the elements are freely positioned within the cable so that an operator can extract them easily from the cable. In other words, the elements can freely move within the cable's central cavity.

Such cable designs are commonly used for optical-fiber telecommunications networks. By way of example, an optical-fiber cable may include elements (e.g., optical modules or buffer tubes) that are designed to be extracted from the cable in order to serve different buildings. For this purpose, an operator may create an opening in the cable to extract one or more modules that are then taken to a building that is to be served. Other modules can remain within the cable to be extracted (e.g., available to serve another building).

Such optical-fiber cables typically have an outer sheath that defines a central cavity in which optical-fiber modules may extend. Each module typically includes one or more optical fibers, usually between one and twelve optical fibers, wrapped together within the center of the module. The outer sheath is typically made of a polymer (e.g., polyethylene). The outer sheath may also include reinforcements (e.g., strength members) extending longitudinally along the axis of the cable. Such reinforcements may serve to stiffen the structure to prevent the cable from deforming excessively under the effects of temperature or an external force (e.g., from traction or compression).

When an operator in the field seeks to extract a length of an element (e.g., a module) from the cable, the length of an element that can be extracted is limited by several factors. By way of example, the packing ratio of the elements in the cable may limit the length of a module that can be extracted. The packing ratio is defined as the ratio of the sum of the cross-sectional areas of all of the elements divided by the cross-sectional area of the cavity. Other factors that can affect the length of an element that can be extracted include the coefficient of friction between two elements and the coefficient of friction between an element and the wall of the cable cavity.

By way of example, commonly owned European Patent Application Publication No. EP 1921478 A1, which is hereby incorporated by reference in its entirety, discloses a cable including modules and having a maximum packing ratio of 0.7, with the ratio preferably lying in the range of 0.3 to 0.35. The cable includes a solid lubricant (e.g., talc) placed within the cavity to reduce the coefficient of friction between two modules and the coefficient of friction between a module and the wall of the cavity. In the absence of a solid lubricant, the coefficient of friction between the modules (e.g., made of polyester based on thermoplastic elastomers or plasticized PVC) and the inner wall of the cable was high.

Nevertheless, the cable described in European Patent Application Publication No. EP 1921478 A1 has several drawbacks. For example, it requires a large amount of solid lubricant in the cavity to ensure that lubricant is present at all places between two modules. Furthermore, although the length of module that can be extracted may reach 30 meters (m), which is sufficient to enable a cable to be installed in an external duct such as a sewer, such a length is not sufficient for all kinds of applications.

Proposals have also been made to use materials such as polyester or polyamide for the modules in order to reduce their respective coefficients of friction relative to the cable. Thus, if a solid lubricant is provided in insufficient quantities or distributed with insufficient uniformity in the cavity containing the modules, the absence of solid lubricant can be at least partially mitigated so as to retain an acceptable extraction length.

The foregoing notwithstanding, prior cable designs do not allow modules to be extracted from a cable at a sufficient length for all applications (e.g., a branch connection). Indeed, prior solutions do not enable extraction lengths of more than about 30 meters, because the extraction force required becomes too great and often leads to the extracted element being damaged or broken. Accordingly, a need exists for cable designs that better facilitate module extraction.

SUMMARY

Accordingly, in one aspect, the present invention embraces a cable having a cavity in which elements, typically extending substantially in parallel, can be extracted in a reliable manner over a predefined extraction length. In some embodiments, the present invention facilitates element extraction at greater lengths than could be achieved with prior cable designs.

An exemplary cable includes an outer sheath that defines a longitudinal cavity. The material forming the wall of the cavity (e.g., the inner wall of the outer sheath) is typically polyethylene, polypropylene, or a halogen-free, flame-retardant material. In some embodiments, one or more mechanical reinforcements extending along the axis of the cable may be positioned (e.g., embedded) within the outer sheath. Typically, the mechanical reinforcements extend longitudinally within the outer sheath parallel to the axis of the cable and parallel to elements within the cable.

A plurality of elements (e.g., optical modules, tight buffered optical fibers, semi-tight buffered optical fibers, and/or buffer tubes) are typically positioned (e.g., in parallel) within the cavity. A tape (e.g., a polyester tape) may be positioned between the elements and the outer sheath. In other words, the tape may substantially cover the inner wall of the outer sheath. Typically, each element includes one or more optical fibers. Each element typically includes an element sheath (e.g., a polymeric tube for enclosing one or more optical fibers) made of a thermoplastic polymer material (e.g., polyamide 12, polybutylene terephthalate, or a copolyester thermoplastic elastomer) having a hardness greater than 65 on the Shore D scale. In a particular embodiment, at least one element is a multi-fiber module in which several fibers are embedded in a seal and peel hot-melt covered with a thermoplastic material. In another particular embodiment, at least one element is a micromodule covered with a thermoplastic material having a Shore D hardness of greater than 65.

In general, reduced friction between two polymers is obtained when the polymers have low coefficient of friction. However, and without being bound to a particular theory, the present inventors have found that the hardness of a polymeric material can influence the force needed to extract an element from a cable. In particular, a cable element made from a harder material (e.g., a material having a high Shore hardness) has reduced sensitivity to deformations. Reduced deformations typically result in less contact surface between neighboring elements. As a result of the reduced contact surface, the force needed to extract an element from a cable may be reduced when the element is made from a hard material.

The packing ratio of the elements within the cable is typically between about 0.3 and 0.7, more typically between about 0.3 and 0.5. As noted, the packing ratio is defined as the ratio of the sum of the cross-sectional areas of all of the elements (e.g., optical-fiber modules) divided by the cross-sectional area of the cavity.

The plurality of elements are typically coated (e.g., at least partially coated) with a lubricant film. Typically, silicone oil (e.g., polydimethylsiloxane) is used as a lubricant. The lubricant may be selected so that the coefficient of friction between two elements made of polyamide 12 is less than 0.2. In one embodiment, the lubricant may be selected so that the coefficient of friction between an element and the wall of a cavity made of a halogen-free, flame-retardant material is less than 0.2. In an exemplary embodiment, the lubricant may be selected in such a manner that the coefficient of friction between an element and a tape made of polyester is less than 0.1.

In another aspect, the present invention embraces a method of manufacturing a cable. The method includes the step of forming a lubricant film covering, at least in part, the outside surfaces of a plurality of elements positioned within a longitudinal cavity formed by an outer sheath of a cable. In one embodiment, the elements are coated with a lubricant by passing the elements through a mist of fine droplets. The droplets are typically formed from a stabilized emulsion of a lubricant in water. Typically, the lubricant is silicone oil, such as polydimethylsiloxane. In one embodiment, water may represent at least about 95 percent by volume of the emulsion. The lubricant may represent between about 1 percent and 2 percent by volume of the emulsion. A stabilizing agent may represent between about 1 percent and 2 percent by volume of the emulsion. After the water in the emulsion evaporates (e.g., by actively evaporating the water or passively waiting for the water to evaporate), a lubricant film is formed.

In yet another aspect, the present invention embraces a method of extracting at least one element from a cable. A first opening is made through the outer sheath of a cable in order to cut at least one element. A second opening is made through the outer sheath to extract the one element from the cable. The second opening is situated at a distance of more than 50 meters from the first opening.

In one embodiment, in a first step, the outer sheath is cut in order to gain access to the elements that are present within the cavity. After access has been gained, at least one element is cut so that it can be extracted at another position of the cable. In a second step, a second window or opening in the outer sheath is made to gain access to the elements that are present within the cavity. The element that is cut is located and is pulled. Because it has been cut at the first window, it can be partly pulled from the cable through the second opening. The distance of cable that can be pulled is typically equal to the distance between the first and second openings (e.g., at least 50 meters).

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 1 schematically depicts a cross-sectional view of a telecommunications cable 10 provided with a plurality of optical-fiber modules.

FIG. 2 schematically depicts a diagram of a device for measuring coefficient of friction.

FIG. 3 plots friction tests concerning the coefficient of friction between two cable elements of the same kind formed from various kinds of materials, showing the influence of adjustment parameters of the device for measuring coefficient of friction depicted in FIG. 2.

FIG. 4 plots friction tests concerning the coefficient of friction between a polyamide 12 module and the wall of the cable cavity, the wall being made of various materials, showing results with and without lubrication.

DETAILED DESCRIPTION

Figure 5:
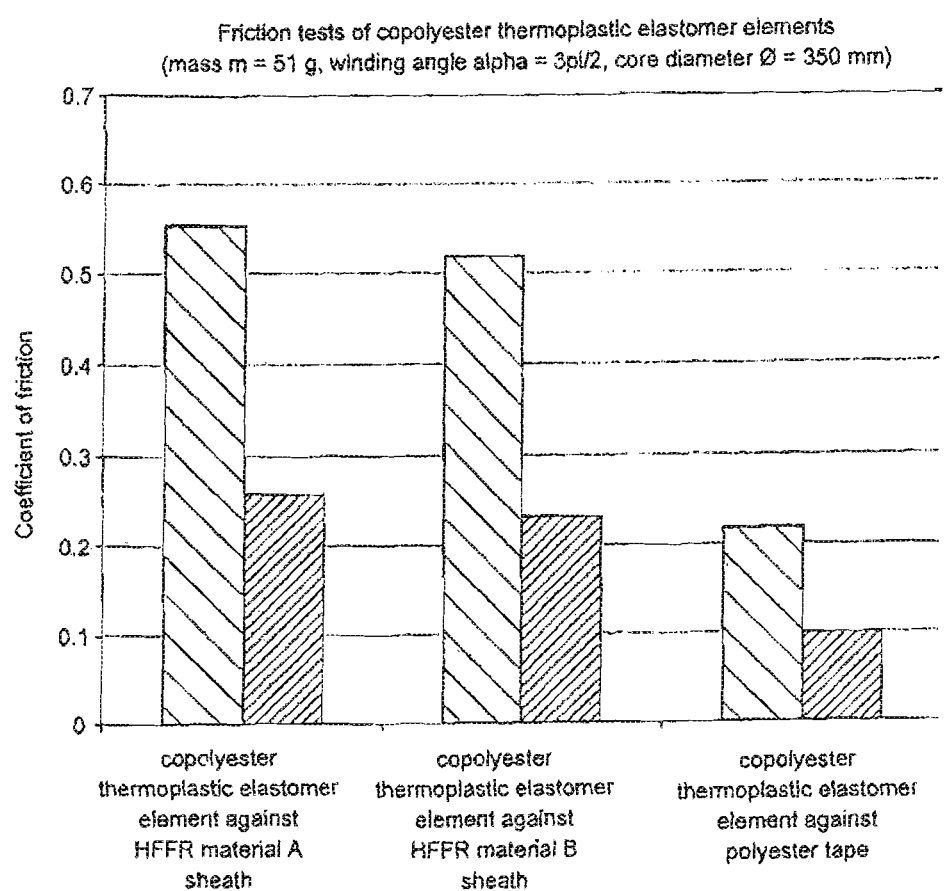
FIG. 5 plots friction tests concerning the coefficient of friction between a copolyester thermoplastic elastomer module and the wall of the cable cavity, the wall being made of various materials, showing results with and without a lubricant.

The description (below) relates to an optical-fiber telecommunications cable including a plurality of optical modules as elements that are to be extracted from the cable. That said, the invention can be generalized to any cable having a cavity in which a plurality of extractable elements are provided.

FIG. 1 depicts a cross-sectional view of a telecommunications cable 10 according to one embodiment of the present invention. FIG. 1 depicts the cable 10 as having a plurality of elements (e.g., optical-fiber modules 1).

Typically, the cable 10 includes an outer sheath 11 defining a cavity 12 in which the optical-fiber modules 1 are placed. The modules 1 may be freely positioned within the cavity 12 (e.g., in parallel). In other words, the modules 1 inside cavity 12 are typically not stranded, cabled, or otherwise organized or bound in a way that would prevent the extraction of an individual module. The cavity 12 has a wall 112 that may come into contact with several of the modules 1.

The cable 10 typically has mechanical reinforcements 13 installed (e.g., embedded) in the outer sheath 11 in order to limit axial deformation (e.g., expansion or contraction) of the cable 10, which can be caused by an external force or by variations in temperature.

A module 1 may be extracted from the cable 10 as follows: Two cuts are made through the outer sheath 11 of the cable 10 at different points therealong in order to create a first opening through which at least one module 1 is cut, and a second opening through which the previously-cut module 1 is extracted from the cable 10. It will be understood that the length of module 1 that is extracted from the cable 10 corresponds to the distance between the two cuts made through the outer sheath 11 of the cable 10.

The optical modules 1 typically are covered, at least in part, by a lubricant on their outside surfaces. The lubricant may be present in the form of a film. The thickness of the lubricant film is small compared with the dimensions of the optical modules. Typically, the thickness of the film is less than about 5 microns (μm), and more typically less than about 1 micron. In comparison, the diameter of an optical module is typically at least several hundred microns.

In one embodiment, the lubricant is applied to the outside surface of one or more of the modules 1 in the form of an emulsion of oil in water. The emulsion may also include a stabilizing agent. The emulsion may be put into contact with the outside surfaces of the modules 1 in the form of a mist of fine droplets. After the water has evaporated, the lubricant then remains attached to the surfaces of the modules 1, thereby forming a lubricant film on the outside surfaces of the modules 1. The agent for stabilizing the emulsion also typically remains on the surfaces of the modules 1.

The quantity of lubricant may be distributed uniformly over all of the modules 1 by the spray effect that is associated with implementing a mist of fine droplets. Typically, the lubricant is applied by causing the modules 1 to pass through a closed medium containing the mist. By controlling the duration of deposition, it is also possible to deposit a film with a greater or smaller thickness.

The foregoing method of forming a lubricant film avoids the need to fill the cavity with a lubricant, generally in solid form, in a quantity that is large and sufficient to ensure that all of the modules 1 have lubricant on their surfaces.

Furthermore, the fact that the film is attached to the outside surfaces of the modules 1 avoids any potential problem of the lubricant being distributed non-uniformly around the modules 1 in the cavity 12.

The lubricant used is typically a silicone oil (e.g., polydimethylsiloxane (PDMS)). Tests described hereinafter demonstrate that having a lubricant film on the outside surfaces of the modules 1 makes it possible to achieve extraction lengths that are much longer than those that have been achieved previously. In this regard, these extraction lengths may exceed 50 meters. For example, the extraction length may be greater than about 80 meters (e.g., 100 meters or more).

The emulsion typically includes a volume of water including between about 1 percent and 2 percent of lubricant in the form of oil (e.g., silicone oil), together with between about 1 percent and 2 percent of a stabilizing agent. By way of example, the stabilizing agent may be a non-ionic surface-active agent, such as an agent of the ethoxylated tridecyl alcohol family.

Whatever the nature of the lubricant, the emulsion typically has a quantity of water that is greater than about 95 percent by volume.

Numerous experimental tests have been performed demonstrating advantages of the present invention. These tests were performed on various materials forming a module 1 or the wall 112 of the cavity 12.

The measurement device used for determining the coefficient of friction is itself well known, and the technique employed is in widespread use in the field of cables.

One such device is shown in FIG. 2, in a variant embodiment suitable for determining the coefficient of friction (e.g., the measured effective coefficient of friction) between an optical module 1 and the outer sheath 11 of the cable 10 in which the module is inserted.

The technique includes winding a cable 10 around a stationary cylindrical core 20 and suspending a mass 21 from one end of an optical module 1. The mass 21 thus exerts a weight P of known value on the end of the optical module 1. The optical module 1 is then pulled from its other end with a force F to cause it to slide in the outer sheath 11 of the cable. When the optical module slides, the force F is measured (e.g., with a dynamometer).

The force F depends on the weight P, on the angle $\alpha$ that the cable is wound around the core 20 (the angle $\alpha$ is $3\pi/2$ in FIG. 2), and on the coefficient of friction. Consequently, it is possible to determine the coefficient of friction between a module 1 and the wall 112 of the cavity 12 by knowing the values of P, F, and $\alpha$.

Variants of this device are used when it is desired to determine the coefficient of friction between two optical modules 1, or between the outer sheath 11 of the cable and a tape (e.g., a polyester tape) for covering the inside wall 112 of the cable cavity 12.

Tests performed with the device depicted in FIG. 2, or with one of its variants, are described with reference to FIGS. 3-6.

FIG. 3 depicts the results of experimental tests showing how adjusting the parameters of the device for measuring coefficients of friction have an influence on the value measured for the coefficient of friction. The coefficients of friction measured in FIG. 3 were obtained between pairs of modules of the same kind.

Four materials were tested, namely: polybutylene terephthalate 1 (with a Shore D hardness of 87), polybutylene terephthalate 2 (with a Shore D hardness of 77), impact-modified polybutylene terephthalate (with a Shore D hardness of 65), and polyamide 12 (with a Shore D hardness of 71). Impact-modified polybutylene terephthalate is a polybutylene terephthalate (PBT) material having mechanical characteristics that have been modified to improve its resistance to impact. For example, it may be PBT modified by adding more flexible polymers. For each of the foregoing kinds of material, tests were performed under various conditions.

That said, under all circumstances the diameter of the core 20 was $\emptyset$=50 millimeters (mm) and the mass 21 was m=100 grams (g).

In contrast, several winding angles were tested, namely (1) a winding angle $\alpha=3\pi$ radians; (2) a winding angle $\alpha=2\pi$ radians; and (3) a winding angle $\alpha=\pi$ radians.

Whatever the nature of the materials, it can be seen that the results diverge to some extent as a function of the winding angle $\alpha$ used. In this regard, it is thought that the contact area between two modules increases with increasing winding angle $\alpha$ of the modules around the core 20.

The results also diverge as a function of the diameter of the core 20, even though, theoretically, that ought not be the case. These results are not shown. In order to make meaningful comparisons, it is therefore preferable to use a device with identical settings.

The tests described (below) with reference to FIGS. 4-6 were therefore carried out under identical conditions for the purpose of showing the advantages of the present invention, particularly in terms of coefficient of friction. More precisely, the mass (m) 21 used was 51 grams, the diameter ($\emptyset$) of the core 20 was 350 millimeters, and the winding angle ($\alpha$) was $3\pi/2$ radians. Measuring the coefficient of friction with a measuring device, which has (i) a mass (m) that is equal to 100 grams (and suspended from one end of an element), (ii) a winding angle ($\alpha$) that is equal to $3\pi/2$ radians, and (iii) a core diameter ($\emptyset$) that is equal to 350 millimeters, is herein referred to as the "Draka coefficient of friction test."

FIG. 4 shows the results of experimental tests for determining the coefficient of friction of a polyamide 12 (PA12) module with various materials used for the wall 112 of the cavity 12, namely a first halogen-free, flame-retardant material (material A-Draka DHF9822), a second halogen-free, flame-retardant material (material B-Megolon 5545 fabricated by the supplier Alphagary), or a polyester film.

With the first two materials (material A, material B), the wall 112 corresponds to the inside wall of the outer sheath 11 of the cable 10. In contrast, with respect to the third material, namely a polyester film, the wall 112 is a polyester tape placed against the inside wall of the outer sheath 11 of the cable so that the tape was in contact with the modules.

With a wall 112 of material A, using a lubricant in accordance with the present invention enables the coefficient of friction to be reduced by a factor of about 4.8, the coefficient being 0.58 in the absence of a lubricant and 0.125 in the presence of a lubricant in accordance with the present invention.

With a wall 112 of material B, using a lubricant in accordance with the present invention enables the coefficient of friction to be reduced by a factor of about 5.7, the coefficient being 0.57 in the absence of a lubricant and 0.1 in the presence of a lubricant in accordance with the present invention.

With a polyester tape covering the wall 112, using a lubricant in accordance with the present invention enables the coefficient of friction to be reduced by a factor of about 7, the coefficient being 0.28 in the absence of a lubricant and 0.04 in the presence of a lubricant in accordance with the present invention.

The presence of a lubricant (e.g., a lubricant film) at the surface of the modules enables the coefficient of friction between a PA12 module and the wall 112 of the cable cavity to be greatly reduced (e.g., by a factor lying in the range of 4.8 to 7), regardless of the materials used for the wall 112.

Significant reductions in the coefficient of friction between a module made of a copolyester thermoplastic elastomer (e.g., Arnitel®) and the foregoing materials (i.e., material A, material B, and a polyester film) have also been found. The results obtained under such conditions are given in FIG. 5.

Here, with respect to the first two materials (i.e., material A, material B), the wall 112 corresponds to the inside wall of the outer sheath 11 of the cable. In contrast, with respect to the third material (polyester), the wall 112 is covered by a polyester tape placed against the inside wall of the outer sheath 11 of the cable, such that the tape is in contact with the modules.

More precisely, with a wall 112 made of material A, using a lubricant in accordance with the present invention makes it possible to reduce the coefficient of friction by a factor of about 2.1, the coefficient being 0.55 in the absence of a lubricant and 0.26 in the presence of a lubricant in accordance with the present invention.

With a wall 112 of material B, the use of a lubricant in accordance with the present invention makes it possible to reduce the coefficient of friction by a factor of about 2.3, the coefficient being 0.52 in the absence of a lubricant and 0.23 in the presence of a lubricant in accordance with the present invention.

With a wall 112 covered by a polyester film, the use of a lubricant in accordance with the present invention enables the coefficient of friction to be reduced by a factor of about 1.24, the coefficient being 0.46 in the absence of a lubricant and 0.37 in the presence of a lubricant in accordance with the present invention.

The coefficients of friction are thus reduced by a factor lying in the range of 1.24 to 2.3 in the presence of a lubricant, which constitutes a smaller reduction than that obtained with modules made of PA12.

In order to increase the length of a module that it is possible to extract, modules made of PA12 are typically used. That said, using modules made of copolyester thermoplastic elastomer is within the scope of the present invention.

Figure 6:
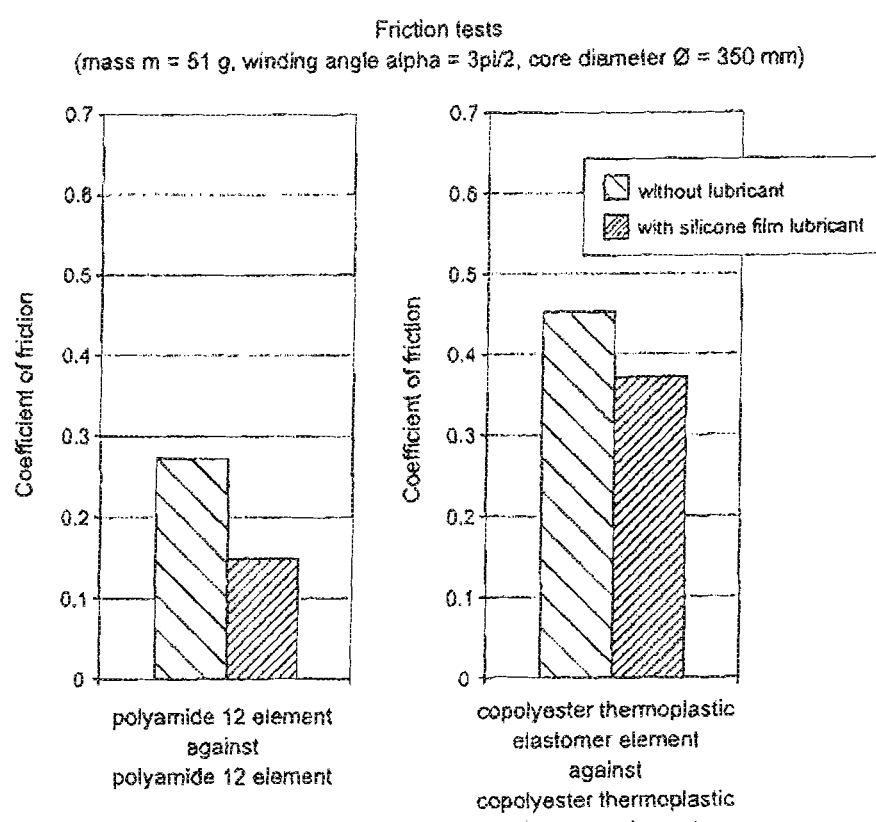
FIG. 6 plots friction tests concerning the coefficient of friction between two modules made of the same material, firstly for polyamide 12 and secondly for copolyester thermoplastic elastomer, showing results with and without a lubricant.

FIG. 6 provides the coefficients of friction between two PA12 modules or copolyester thermoplastic elastomer modules, in the absence of a lubricant and in the presence of a lubricant in accordance with the present invention.

With PA12 modules, the use of a lubricant in accordance with the present invention makes it possible to reduce the coefficient of friction by a factor of about 1.8, the coefficient being 0.27 in the absence of a lubricant and 0.15 in the presence of a lubricant in accordance with the present invention.

With copolyester thermoplastic elastomer modules, the use of a lubricant in accordance with the present invention enables the coefficient of friction to be reduced by a factor of about 1.24, the coefficient being 0.46 in the absence of a lubricant and 0.37 in the presence of a lubricant in accordance with the present invention.

It is thus preferable to use PA12 modules with a lubricant in accordance with the present invention in order to reduce the coefficient of friction between modules.

These experimental results shown in FIG. 6 tend in the same direction as those shown in FIGS. 4-5.

The materials tested for the outer sheath included various kinds of halogen-free, flame-retardant materials. Analogous results could be shown using an outer sheath made of either polyethylene or polypropylene.

In order to demonstrate advantages of the present invention over existing solutions, tests have been performed concerning extracting PA12 modules from a cable 10 having its sheath made of material A, with the extracted length being 80 meters. These test are shown in FIG. 7.

Figure 7:
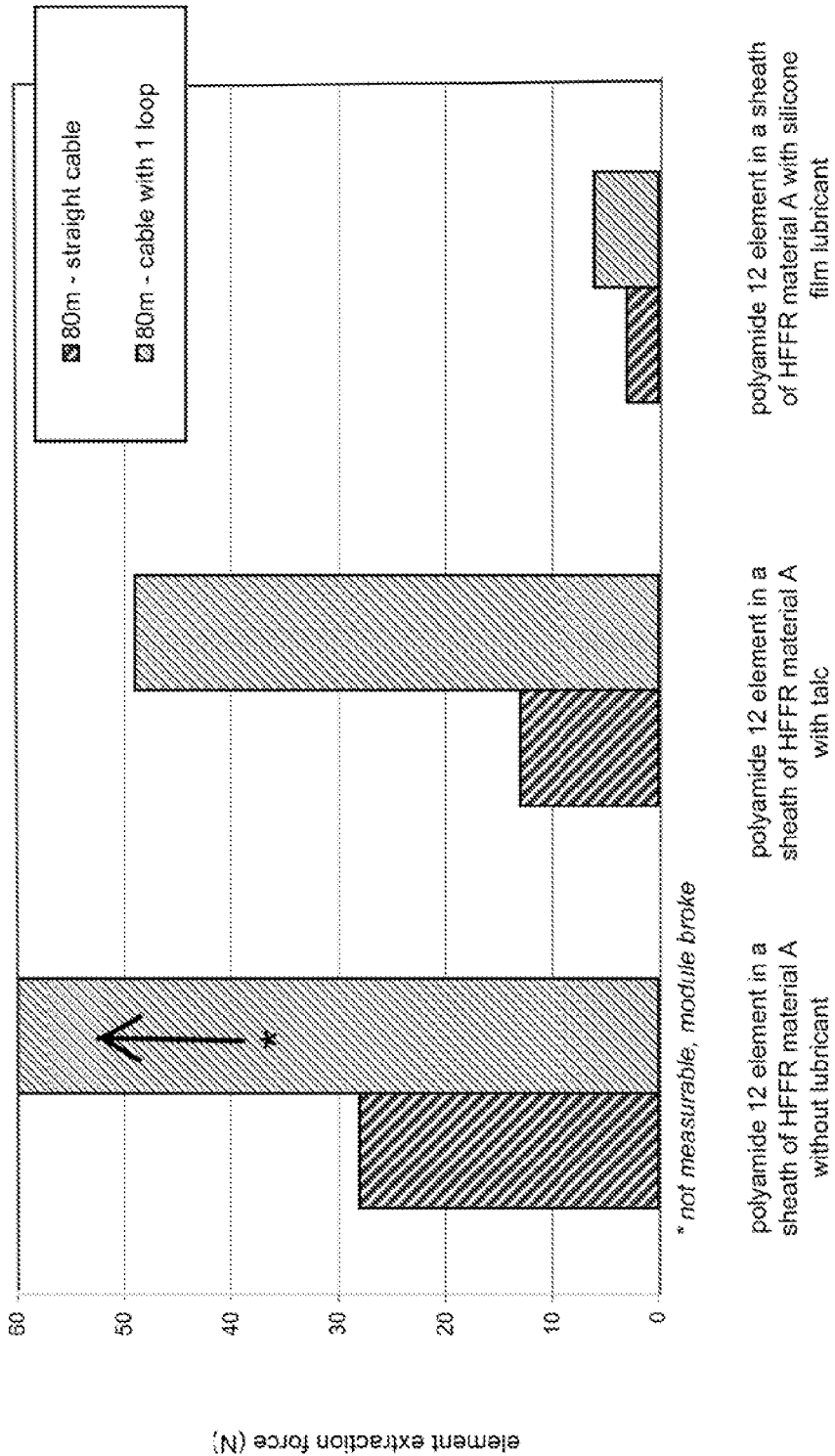
FIG. 7 compares variation in the force required to extract a polyamide 12 element located in a cable having its cavity wall made of a halogen-free, flame-retardant material (material A), showing results without a lubricant, with talc, and with a silicone film lubricant.

The tests shown in FIG. 7 were performed using a cable 10 as shown in FIG. 1 and having the following characteristics: 48 modules, each having a diameter of 900 microns (μm), disposed in a cavity 12 with a diameter of 9.1 millimeters (mm). The packing ratio of the cable 10 was thus 0.47.

That said, the cable was tested in three variants. Moreover, each variant was tested with the cable 10 in a rectilinear position and with the cable 10 in a position including a loop. It will be understood that a cable in a loop position has greater resistance to extraction.

The first tested variant did not include a lubricant, the second tested variant included a solid lubricant, specifically talc, and the third variant included a lubricant film, namely a silicone film placed on the surfaces of the modules. As noted, European Patent Application Publication No. EP 1921478 A1 proposed using talc as a lubricant.

It was found that the force needed to extract a module is considerably reduced between a cable having no lubricant and a cable having talc as a lubricant. It was further found that the force needed to extract a module is considerably reduced between a cable having talc as a lubricant and a cable having a lubricant implemented in accordance with the present invention (e.g., having a silicone film lubricant). These findings apply both when the cable is straight and when it is in a loop.

In this regard, forces expressed in newtons (N) are plotted up the ordinate in FIG. 7. More precisely, when considering a straight cable, the force needed for extracting a module over a length of 80 meters goes from about 28 newtons (no lubricant) to about 13 newtons (talc as lubricant) and then to about 3 newtons (lubricant in accordance with the invention).

Furthermore, when considering a cable that includes a loop, the force needed to extract a module over a length of 80 meters goes from about 49 newtons (talc as lubricant) to about 6 newtons (lubricant in accordance with the invention), that is to say a reduction of a factor of about 8. In the absence of a lubricant, the module broke.

The force needed to extract a PA12 module from a cable having its outer sheath made of material A is thus reduced by a factor of about 5 going from a lubricant, such as talc, which is known for this purpose, to a lubricant in accordance with the present invention.

Accordingly, the present invention facilitates element extraction over a length of at least about 80 meters using a force of less than about 10 newtons, where the coefficient of friction is between about 0.3 and 0.7, such as at least about 0.4 (e.g., 0.45 or more).

The tests performed were carried out using a cable having a packing ratio of 0.47. That said, telecommunications cables typically have a packing ratio less than 0.47, which can make it somewhat easier to extract a module. Nevertheless, it is thought that the advantages produced by a cable in accordance with the present invention extend to a cable for which the packing ratio is higher or lower than 0.47.

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); U.S. patent application Ser. No. 12/614,172 for a Multimode Optical System, filed Nov. 6, 2009, (Gholami et al.); U.S. patent application Ser. No. 12/617,316 for an Amplifying Optical Fiber and Method of Manufacturing, filed Nov. 12, 2009, (Pastouret et al.) U.S. patent application Ser. No. 12/629,495 for an Amplifying Optical Fiber and Production Method, filed Dec. 2, 2009, (Pastouret et al.); U.S. patent application Ser. No. 12/633,229 for an Ionizing Radiation-Resistant Optical Fiber Amplifier, filed Dec. 8, 2009, (Regnier et al.); U.S. patent application Ser. No. 12/636,277 for a Buffered Optical Fiber, filed Dec. 11, 2009, (Testu et al.); U.S. patent application Ser. No. 12/683,775 for a Method of Classifying a Graded-Index Multimode Optical Fiber, filed Jan. 7, 2010, (Gholami et al.); U.S. patent application Ser. No. 12/692,161 for a Single-Mode Optical Fiber, filed Jan. 22, 2010, (Richard et al.); U.S. patent application Ser. No. 12/694,533 for a Single-Mode Optical Fiber Having an Enlarged Effective Area, filed Jan. 27, 2010, (Sillard et al.); U.S. patent application Ser. No. 12/694,559 for a Single-Mode Optical Fiber, filed Jan. 27, 2010, (Sillard et al.); and U.S. patent application Ser. No. 12/708,810 for a Optical Fiber Amplifier Having Nanostructures, filed Feb. 19, 2010, (Burow et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. patent application Ser. No. 12/558,390 for a Buffer Tubes for Mid-Span Storage, filed Sep. 11, 2009, (Barker); U.S. patent application Ser. No. 12/614,692 for Single-Fiber Drop Cables for MDU Deployments, filed Nov. 9, 2009, (Overton); U.S. patent application Ser. No. 12/614,754 for Optical-Fiber Loose Tube Cables, filed Nov. 9, 2009, (Overton); U.S. patent application Ser. No. 12/615,003 for a Reduced-Size Flat Drop Cable, filed Nov. 9, 2009, (Overton et al.); U.S. patent application Ser. No. 12/615,106 for ADSS Cables with High-Performance Optical Fiber, filed Nov. 9, 2009, (Overton); U.S. patent application Ser. No. 12/615,698 for Reduced-Diameter Ribbon Cables with High-Performance Optical Fiber, filed Nov. 10, 2009, (Overton); U.S. patent application Ser. No. 12/615,737 for a Reduced-Diameter, Easy-Access Loose Tube Cable, filed Nov. 10, 2009, (Overton); U.S. patent application Ser. No. 12/642,784 for a Method and Device for Manufacturing an Optical Preform, filed Dec. 19, 2009, (Milicevic et al.); U.S. patent application Ser. No. 12/648,794 for a Perforated Water-Blocking Element, filed Dec. 29, 2009, (Parris); U.S. patent application Ser. No. 12/649,758 for a UVLED Apparatus for Curing Glass-Fiber Coatings, filed Dec. 30, 2009, (Hartsuiker et al.); and U.S. patent application Ser. No. 12/700,293 for a Central-Tube Cable with High-Conductivity Conductors Encapsulated with High-Dielectric-Strength Insulation, filed Feb. 4, 2010, (Ryan et al.).

In the specification and/or figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A cable, comprising:
an outer sheath that has an inner wall defining a longitudinal cavity;
a plurality of buffer tubes freely positioned lengthwise within said outer sheath's longitudinal cavity; and
a lubricant film at least partially covering the outside surface of at least one of said buffer tubes, said lubricant film having a thickness of less than 5 microns and being the only lubricant within said outer sheath's longitudinal cavity;
wherein any mechanical reinforcements, if present, are embedded in said outer sheath such that no mechanical reinforcements are positioned within said outer sheath's longitudinal cavity;
wherein the cable has a packing ratio of between about 0.4 and 0.7; and
wherein a length of at least about 80 meters of one of said buffer tubes is extractible from the cable using a force of no more than about 10 N when said at least 80 meters of said buffer tubes are extracted by (i) making a first opening through said outer sheath of the cable and thereafter cutting at least one of said buffer tubes, (ii) making a second opening through said outer sheath, the second opening being situated at a distance of at least 80 meters from the first opening, and (iii) pulling at least one of said cut buffer tubes through the second opening.

2. The cable according to claim 1, wherein said lubricant film comprises silicone oil.

3. The cable according to claim 1, wherein said lubricant film comprises polydimethylsiloxane.

4. The cable according to claim 1, wherein said lubricant film at least partially covers the respective outside surfaces of each of said buffer tubes.

5. The cable according to claim 1, wherein at least one of said buffer tubes comprises polyamide 12, polybutylene terephthalate, and/or a copolyester thermoplastic elastomer.

6. The cable according to claim 1, wherein at least two of said buffer tubes comprise polyamide 12.

7. The cable according to claim 1, wherein said outer sheath's inner wall comprises polyethylene and/or polypropylene.

8. The cable according to claim 1, wherein said outer sheath's inner wall comprises a halogen-free, flame-retardant material.

9. The cable according to claim 1, comprising a tape at least partially covering the inside of said outer sheath's inner wall, said tape being positioned between said buffer tubes and said outer sheath.

10. The cable according to claim 9, wherein said tape comprises polyester.

11. The cable according to claim 1, comprising a tape substantially covering the inside of said outer sheath's inner wall, said tape being positioned between said buffer tubes and said outer sheath.

12. The cable according to claim 1, wherein the cable has a packing ratio of less than 0.5.

13. The cable according to claim 1, comprising a plurality of mechanical reinforcements embedded within said outer sheath, said mechanical reinforcements extending along the length of the cable.

14. The cable according to claim 1, comprising one or more optical fibers positioned within at least one of said buffer tubes.

15. The cable according to claim 1, comprising a plurality of optical fibers, wherein at least one optical fiber is positioned within each of said buffer tubes.

16. The cable according to claim 1, wherein said lubricant film has a thickness of less than about 1 micron.

17. The cable according to claim 16, wherein at least one of said buffer tubes comprises polyamide 12, polybutylene terephthalate, and/or a copolyester thermoplastic elastomer.

18. The cable according to claim 16, wherein said outer sheath's inner wall comprises polyethylene, polypropylene, and/or a halogen-free, flame-retardant material.

19. The cable according to claim 16, comprising a tape at least partially covering the inside of said outer sheath's inner wall, said tape being positioned between said buffer tubes and said outer sheath.

20. The cable according to claim 16, comprising a plurality of mechanical reinforcements embedded within said outer sheath, said mechanical reinforcements extending along the length of the cable.

21. The cable according to claim 16, comprising one or more optical fibers positioned within at least one of said buffer tubes.

\* \* \* \* \*